(12) United States Patent
Fickeisen et al.

(10) Patent No.: US 8,919,526 B2
(45) Date of Patent: Dec. 30, 2014

(54) SLEWING BELT MOUNTING

(75) Inventors: Steffen Fickeisen, Bad Durkheim (DE); Joschka Neumann, Mannheim (DE)

(73) Assignee: Joseph Vogele AG, Ludwigshafen/Rhein (DE)

( * ) Notice: Subject to any disclaimer, the term of this patent is extended or adjusted under 35 U.S.C. 154(b) by 86 days.

(21) Appl. No.: 13/640,573

(22) PCT Filed: Apr. 15, 2011

(86) PCT No.: PCT/EP2011/001937
§ 371 (c)(1),
(2), (4) Date: Dec. 21, 2012

(87) PCT Pub. No.: WO2011/128113
PCT Pub. Date: Oct. 20, 2011

(65) Prior Publication Data
US 2013/0087437 A1    Apr. 11, 2013

(30) Foreign Application Priority Data
Apr. 16, 2010 (EP) .................................... 10004064

(51) Int. Cl.
*B65G 21/12* (2006.01)
*E01C 19/48* (2006.01)
*B65G 41/00* (2006.01)

(52) U.S. Cl.
CPC .............. *B65G 21/12* (2013.01); *B65G 41/002* (2013.01); *B65G 41/00* (2013.01); *B65G 41/001* (2013.01); *E01C 19/48* (2013.01); *E01C 2301/04* (2013.01)
USPC ........ 198/318; 198/317; 198/592; 198/861.2; 198/861.5

(58) Field of Classification Search
CPC ..... B65G 41/001; B65G 41/002; B65G 21/12
USPC ........ 198/317, 318, 320, 861.1, 861.4, 861.5, 198/861.6
See application file for complete search history.

(56) References Cited

U.S. PATENT DOCUMENTS 5,203,442 A * 4/1993 Oury et al. .................... 198/313
5,577,808 A * 11/1996 Gilbert ......................... 299/39.2
(Continued)

FOREIGN PATENT DOCUMENTS

| CN | 101294367 A | 10/2011 |
|---|---|---|
| DE | 2628325 A1 | 1/1978 |

(Continued)

OTHER PUBLICATIONS

International Preliminary Report on Patentability, mailed Oct. 16, 2012, which issued in corresponding International Application No. PCT/EP2011/001937.

(Continued)

*Primary Examiner* — Leslie A Nicholson, III
(74) *Attorney, Agent, or Firm* — Fish & Richardson P.C.

(57) ABSTRACT

The invention relates to a conveyor belt mounting for a charger that is used in road building, in order to supply a road-finishing machine with paving material. Using the slewing belt mounting, it is possible to achieve different discharge heights for the paving material. The slewing belt mounting comprises a cantilever arm, which is movably mounted on the frame of the charger, a pivot arm, which is pivotally connected to the cantilever arm, and a conveyor belt, which is connected to the pivot arm. The slewing belt mounting is characterized in that it comprises at least one lifting element, such as a hydraulic cylinder, cable winch, toothed rack, gear mechanism or the like, which is fastened by a first end to the frame and by a second end to the cantilever arm, wherein the cantilever arm is vertically adjustable by means of the lifting element.

15 Claims, 2 Drawing Sheets

(56) References Cited

U.S. PATENT DOCUMENTS

| | | | |
|---|---|---|---|
| 5,645,256 A * | 7/1997 | Thomas, II | 248/222.11 |
| 6,298,981 B1 * | 10/2001 | Hosch et al. | 198/813 |
| 6,725,996 B2 | 4/2004 | Grundl | |
| 6,845,859 B2 | 1/2005 | Grundl | |
| 8,100,481 B2 * | 1/2012 | Von Schonebeck et al. | 299/39.6 |
| 8,388,070 B2 * | 3/2013 | Von Schonebeck et al. | 299/39.2 |
| 8,424,666 B2 * | 4/2013 | Berning et al. | 198/313 |
| 8,590,983 B2 | 11/2013 | Berning et al. | |
| 2002/0121430 A1 | 9/2002 | Grundl | |
| 2004/0060798 A1 | 4/2004 | Grundl | |
| 2006/0285923 A1 | 12/2006 | Musil et al. | |
| 2008/0315666 A1 * | 12/2008 | Von Schonebeck et al. | 299/39.6 |
| 2009/0267402 A1 * | 10/2009 | Berning et al. | 299/39.4 |
| 2010/0237681 A1 * | 9/2010 | Von Schonebeck et al. | 299/18 |

FOREIGN PATENT DOCUMENTS

| | | |
|---|---|---|
| DE | 29812115 U1 | 3/1999 |
| JP | 6156664 A | 6/1994 |
| JP | 09316817 A | 12/1997 |
| JP | 2002356219 A | 12/2002 |
| JP | 2010031533 A | 2/2010 |

OTHER PUBLICATIONS

English translation of Japanese Office Action for JP Patent Application No. 2013-504170 dated Nov. 19, 2013.

International Search Report mailed Jul. 14, 2011, which issued during International Application No. PCT/EP2011/001937.

Office Action which issued on May 23, 2014 in corresponding Chinese Patent Application No. 201180019441.0, with English translation thereof.

* cited by examiner

SLEWING BELT MOUNTING

CROSS REFERENCES TO PRIOR APPLICATIONS

This is a U.S. National Phase application under 35 U.S.C. §371 of International Patent Application No. PCT/EP2011/001937, filed Apr. 15, 2011, and claims the priority of European Patent Application No. 10004064.1, filed Apr. 16, 2010 both of which are incorporated by reference herein in their entirety. The International Application published in German on Oct. 20, 2011 as WO 2011/128113 under PCT Article 21(2).

FIELD OF THE INVENTION

The present invention relates to a slewing belt mounting to be fixed at a frame (2) of a charger.

BACKGROUND OF THE INVENTION

In road construction, chargers are used to supply road finishing machines with bituminous paving material. In road construction, charger vehicles drive ahead of the road finishing machines to ensure that sufficient paving material is continuously available for the road finishing machine during the asphalting process. Charger vehicles comprise a material bunker in which paving material transported from trucks to the road construction site is intermediately stored. Conveyor means, for example conveyor belts, are guided away from the material bunker and supply the paving material out of the material bunker to a following road finishing machine. During the transport of the viscous paving material, the conveyor belts of the chargers are subjected to high mechanical and thermal stresses. Charger vehicles are expected to supply the paving material to be conveyed to the road finishing machine at a certain height. Therefore, the conveyor belts of the chargers are disposed to be vertically adjustable. In most cases, the conveyor belts can be pivoted about a pivot axis extending through a deflection roller in a vertically adjustable manner, so that a desired discharge height is reached at the discharge place. However, it showed in practice that an inclination of the conveyor belt is only possible within limits to reach a desired discharge height. The reason for this is that with an excessively steep position of the conveyor belt, transporting capacity is affected. For example, with an excessively steep position, paving material might be shifted to the rear and not be conveyed into the desired direction. Moreover, the conveyor belt might no longer be operated at all speeds with an excessively steep position.

EP 0 957 205 B1 describes a road finishing machine or a charger system, respectively. Here, a road finishing machine, which is simultaneously designed as a charger, drives ahead of another road finishing machine. Via a conveyor assembly consisting of two conveyor belts, bituminous paving material can be supplied by a first conveyor belt to a screed of the first road finishing machine or be poured towards the following road finishing machine by a second conveyor belt. To supply the viscous paving material to the following road finishing machine at a certain height, the second conveyor belt of the first road finishing machine or charger is arranged to be vertically adjustable. To be able to adjust the discharge height of the vertically adjustable conveyor belt, the conveyor belt is suspended at the chassis to be pivoted about an axis of a front deflection roller.

DE 298 12 115 U1 relates to a transfer unit for transporting bound and non-bound building materials into paving units, preferably for transporting mixed material into paving units for asphalt layers. The transfer unit comprises a conveyor assembly consisting of two conveyor belts, wherein one belt of the transfer unit is designed as a slewing belt which can be vertically adjusted to realize different conveyor heights. The vertical adjustment of the belt is effected between 15° and 25° with respect to the horizontal line. Slewing motions of the conveyor belts are continuously variable hydraulically and can be well modulated. It is also possible to actuate the slewing motion via other means, such as cable winches, toothed racks or mechanical gear mechanisms. However, during the slewing motion or the vertical adjustment of the conveyor belts, one has to take care that an excessively steep position affects the transporting capacity of the conveyor belts.

The object underlying the invention is to provide a charger system which reaches a desired discharge height using simple constructive means without affecting transporting capacity.

This object is achieved with the present invention.

The invention describes a slewing belt mounting suited for being attached to a charger. By the attachment of the slewing belt mounting, a given discharge height of the paving material can be achieved.

The slewing belt mounting is attached to the frame of the charger. According to the invention, the slewing belt mounting comprises a cantilever arm mounted at the frame of the charger, a pivot arm which is pivotally connected to the cantilever arm, and a conveyor belt which is connected to the pivot arm. It is characteristic of the invention that the slewing belt mounting comprises at least one lifting element, such as a hydraulic cylinder, a cable winch, a toothed rack, a gear mechanism, or the like which is fixed with a first end at the frame and with a second end at the cantilever arm, wherein the cantilever arm is vertically adjustable by the lifting element. Below, the lifting element will be referred to as hydraulic cylinder in each case.

It is advantageous to be able to introduce the reaction power of the conveyor belt of the slewing belt mounting above the cantilever arm directly into the frame of the charger. Since the slewing belt mounting is not connected with the frame of the conveyor belt of the charger, oscillating influences of the charger conveyor belt are not transmitted to the conveyor belt of the slewing belt mounting. In the slewing belt mounting, the cantilever arm can be vertically adjusted into a working position by the hydraulic cylinder. Thus, the discharge height of the paving material of the slewing belt mounting can be directly influenced by the position of the cantilever arm. As an alternative, the conveyor belt of the slewing belt mounting can be tilted to adjust the discharge height. Here, it should be taken care that with an excessively steep position of the conveyor belt, less transporting capacity is obtained. It is therefore advantageous to first pilot a prescribed discharge height by a vertical adjustment of the cantilever arm. Moreover, by the vertical adjustment of the cantilever arm, a maximum passing height in the working position and a maximum transport height in a transport position are not exceeded.

In a suitable embodiment, the hydraulic cylinder is rotatably fixed with the first end to the frame and with the second end to the cantilever arm. By this, the cantilever arm can be particularly flexibly adjusted vertically.

Preferably, the pivot arm is movable about a pivot axis. By the possibility of pivoting the pivot arm together with the conveyor belt, different discharge places can be determined for the paving material.

Preferably, the slewing belt mounting is in a transport position when the hydraulic cylinder is retracted. In particular in the retracted state, the hydraulic cylinder offers a stable mounting for the cantilever arm. It is advantageous to secure the cantilever arm by a pin when the hydraulic cylinder is extended or retracted, respectively.

For a safe transport, the slewing belt mounting does not exceed a transport height of 3.10 m in the transport position. Bridge underpasses can be safely traversed thereby.

The cantilever arm is preferably mounted to be movable about a pivot axis. The cantilever arm can be pivoted about the pivot axis to adjust a prescribed discharge height for the conveyor belt of the slewing belt mounting.

In a suitable embodiment, the cantilever arm is mounted to be pivotable from the transport position about the pivot axis. By this, the discharge height can be varied as desired.

It is advantageous for the conveyor belt to comprise pivot positions with a pivoting radius of up to 180°. By this, not only the discharge height, but also the discharge place can be varied with the slewing belt mounting.

In a further advantageous embodiment, the pivot arm comprises a first section and a second section, the two sections being firmly connected to each other. By the first section, the pivot arm is pivotally connected with the cantilever arm, and by the second section, the conveyor belt of the slewing belt mounting can be stably mounted.

A stable attachment of the slewing belt mounting at the charger frame can be supported by the cantilever arm comprising struts. Compressive and tensile forces can be effectively absorbed by the struts.

In a suitable embodiment, the conveyor belt of the slewing belt mounting comprises a receiving portion that projects under the cantilever arm or is offset with respect to the latter. Thereby, the torques acting on the cantilever arm are reduced thus relieving the cantilever arm. It is also advantageous for the pivot axis of the pivot arm to extend through the receiving portion. By this, a mechanical relief of the pivot arm and the cantilever arm is achieved during pivoting.

Preferably, charger material can in practice fall onto the receiving portion of the conveyor belt in any pivot position, where the conveyor belt can accept and convey charger material even during pivoting. It is conceivable that thereby several following road finishing machines are charged with paving material from the slewing belt mounting. A drive of the road finishing machine and the charger vehicle offset in parallel with respect to each other also becomes possible thereby.

In another embodiment of the invention, the pivot axis of the pivot arm extends through the discharge point of the material that is transported by the conveyor assembly of the charger vehicle onto the conveyor belt of the pivot arm. It is thus ensured that during the rotation of the slewing belt, the material falls onto the slewing belt and not onto the floor if the slewing belt is rotated too far to the outside.

In another embodiment, the slewing belt mounting comprises a tensioning element that is tensioned between the pivot arm and the conveyor arm. Possible tensioning elements are, for example, chains or ropes with or without an additional hydraulic cylinder. It is advantageous for the tensioning element to be fixed to an upper end of the first section of the pivot arm. Moreover, by the tensioning element, the conveyor belt of the slewing belt mounting can be pivoted about a pivot axis at a first deflection roller, and thus the discharge height can be varied.

One can take care of a compact attachment of the slewing belt mounting at the frame of a charger if the cantilever arm and the hydraulic cylinder are arranged within the frame of the charger.

In an extended state of the hydraulic cylinder, the cantilever arm can be lifted beyond a height of 3.10 m.

The slewing belt mounting can be fixed to charger vehicles like modules. This permits to quickly and easily install or remove the slewing belt mounting at the charger vehicle.

In a suitable embodiment, during the lifting of the cantilever arm, the inclination of the conveyor belt can be changed. The conveyor belt is, for example, lowered when the cantilever arm is lifted by the hydraulic cylinder.

BRIEF DESCRIPTION OF THE DRAWINGS

Embodiments of the subject matter of the invention will be illustrated with reference to the drawings. In the drawings.

DETAILED DESCRIPTION OF THE INVENTION

Figure 1:
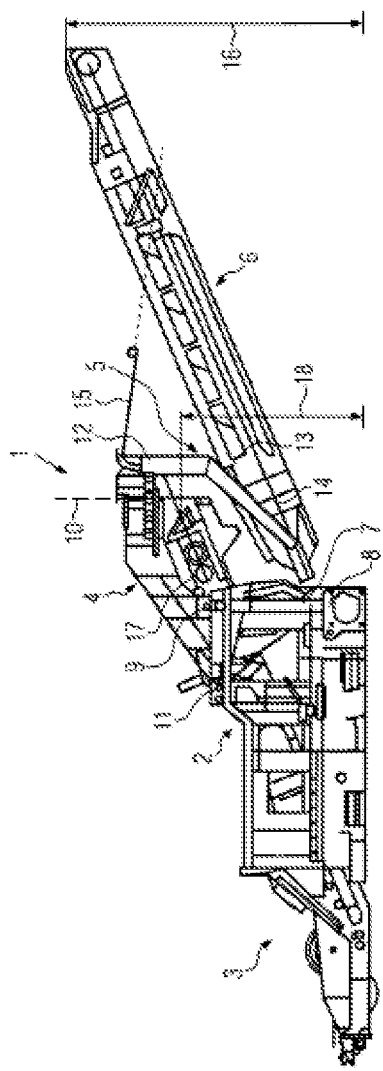
FIG. 1 shows a working position of the slewing belt mounting, the slewing belt mounting being fixed to a charger.

FIG. 1 shows a slewing belt mounting 1 fixed to a frame 2 of a charger 3. The slewing belt mounting 1 comprises a cantilever arm 4 mounted at the frame 2 of the charger 3. Moreover, the slewing belt mounting 1 comprises a pivot arm 5 that is pivotally connected with the cantilever arm 4. FIG. 1 also shows a conveyor belt 6 which is connected with the pivot arm 5. The conveyor belt 6 comprises two deflection rollers and several guide rollers to guide a conveying belt. The transport belt can consist of rubber or a wire mesh. On the transport belt of the conveyor belt 6, carrier ledges can be fixed. These are particularly suited for conveying the paving material.

The slewing belt mounting 1 moreover comprises at least one hydraulic cylinder 7 which is fixed with a first end 8 to the frame 2 and with a second end 9 to the cantilever arm 4. By the hydraulic cylinder 7, the cantilever arm 4 is vertically adjustable.

The pivot arm 5 is mounted movably about a pivot axis relative to the cantilever arm 4.

The cantilever arm 4 is mounted movably about a pivot axis 11 which extends within the frame 2 of the charger 3.

The pivot arm 5 consists of a first section 12 and a second section 13, both sections 12, 13 being firmly connected to each other. For example, the two sections 12, 13 can be screwed to each other or connected by a weld seam, respectively. As an alternative, the pivot arm 5 is designed to be continuous, where the two sections 12, 13 can be manufactured by a bending process.

The conveyor belt 6 comprises a receiving portion 14. The receiving portion 14 extends underneath the cantilever arm 4 and is traversed by the pivot axis 10. Even if the conveyor belt 6 is pivoted about the pivot axis 10, the receiving portion 14 is located underneath the cantilever arm 4.

A tensioning element 15 can be fixed to the conveyor belt 6. While the tensioning element 15 is fixed with one end to the frame of the conveyor belt 6, it is fixed with its other end to the first section 12 of the pivot arm 5. The tensioning element 15 can be, for example, a rope or a chain with or without an additional hydraulic cylinder. By the tensioning element 15, the inclination of the conveyor belt 6 can also be adjusted.

By the slewing belt mounting in accordance with the invention, a desired discharge height 16 can be adjusted at the conveyor belt 6. The discharge height 16 can be either adjusted by a vertical adjustment of the cantilever arm 4, or by inclining the conveyor belt 6 by the tensioning element 15. To maintain a certain inclination of the conveyor belt 6 while the discharge height 16 is changed, during a vertical adjustment of the cantilever arm 4, the inclination of the conveyor belt 6 can be simultaneously adjusted. It is important to take the inclination of the conveyor belt 6 into consideration because transporting capacity is affected as of a certain inclination.

During operation, paving material can be transported via a conveyor assembly 17 to a certain discharge height 18. When the paving material reaches the discharge height 18 on the conveyor assembly 17, the paving material falls onto the receiving portion 14 of the conveyor belt 6. In the process, the conveyor belt 6 can be located in a position pivoted about the pivot axis 10.

While the paving material is falling from the conveyor assembly 17 onto the receiving portion 14 of the conveyor belt 6, high mechanical forces act onto the cantilever arm 4 via the pivot arm 5. In order not to subject the cantilever arm 4 to an excessive mechanical load, the receiving portion 14 of the conveyor belt 6 is disposed underneath the cantilever arm 4.

In FIG. 1, the slewing belt mounting 1 is located in a working position. In the working position, the cantilever arm 4 can be extended to a height of 4 m. In the extended state, a maximum discharge height 16 of 5 m can be reached.

After the paving material has fallen from the conveyor assembly 17 onto the receiving portion 14 of the conveyor belt 6, the paving material is transported to the discharge height 16. From the discharge height 16, a following road finishing machine can be charged with paving material. To uniformly charge a following road finishing machine with paving material, the conveyor belt 6 can be pivoted to and fro within a predetermined angle. By this, one achieves that in a material bunker of the following road finishing machine, the paving material is uniformly poured in.

Figure 2:
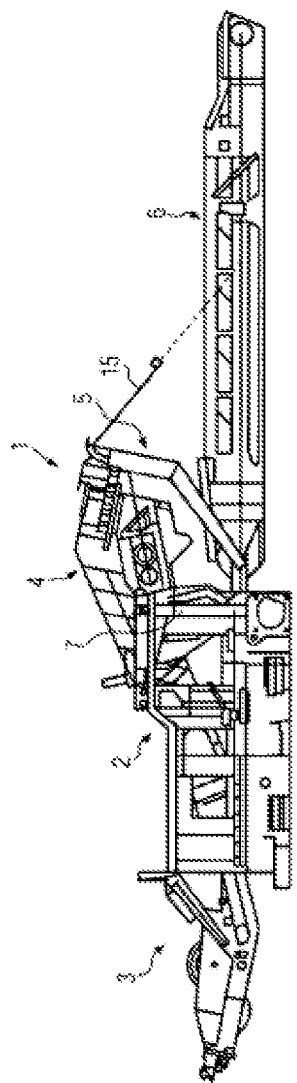
FIG. 2 shows a transport position of the slewing belt mounting together with a charger vehicle.

One can see in FIG. 2 that the slewing belt mounting 1 is fixed to a charger vehicle 3 and is in a transport position. In the transport position, the hydraulic cylinder 7 is retracted. The retracted hydraulic cylinder 7 causes the cantilever arm 4 to be lowered to a transport height where a maximum transport height of 3.10 m is not exceeded. Even in the transport position, the receiving portion 14 of the conveyor belt 6 is located underneath the cantilever arm 4. With the lowered cantilever arm 4, the conveyor belt 6 is also transferred to a horizontal transport position. In the horizontal position, the conveyor belt 6 can be held by the tensioning element 15. The paving material can be also conveyed in the transport position.

The invention claimed is:

1. Slewing belt mounting attached to a frame of a charger, comprising:
    a cantilever arm movably mounted at the frame of the charger,
    a pivot arm pivotally connected relative to the cantilever arm about a vertical pivot axis, and
    a conveyor belt connected to the pivot arm,
    at least one hydraulic cylinder, having a first end affixed to the frame and a second end affixed to the cantilever arm, the cantilever arm being vertically adjustable with respect to the frame by the hydraulic cylinder.

2. Slewing belt mounting according to claim 1, wherein the first end of the hydraulic cylinder is rotatably affixed to the frame and the second end is rotatably affixed to the cantilever arm.

3. Slewing belt mounting according to claim 1, wherein the pivot arm is movable about a pivot axis.

4. Slewing belt mounting according to claim 1, wherein the slewing belt mounting is in a transport position when the hydraulic cylinder is retracted.

5. Slewing belt mounting according to claim 4, wherein the slewing belt mounting does not exceed a transport height of 3.10 m in the transport position.

6. Slewing belt mounting according to claim 1, wherein the cantilever arm is movably mounted about a pivot axis, which extends within the frame of the charger.

7. Slewing belt mounting according to claim 6, wherein the cantilever arm is mounted to be pivotable from a transport position about the pivot axis.

8. Slewing belt mounting according to claim 1, wherein the conveyor belt comprises pivot positions with a pivoting radius of up to 180°.

9. Slewing belt mounting according to claim 1, wherein the pivot arm comprises a first section and a second section, the two sections being connected to each other.

10. Slewing belt mounting according to claim 1, wherein the conveyor belt comprises a receiving portion which projects under the cantilever arm or is offset with respect to the cantilever arm.

11. Slewing belt mounting according to claim 10, wherein charger material falls onto the receiving portion of the conveyor belt in each pivot position, and the conveyor belt receives and conveys charger material while pivoting.

12. Slewing belt mounting according to claim 1 wherein the slewing belt mounting comprises a tensioning element tensioned between the pivot arm and the conveyor belt.

13. Charger with a slewing belt mounting according to claim 1.

14. Slewing belt mounting attached to a frame of a charger, comprising:
    a cantilever arm movably mounted at the frame of the charger,
    a pivot arm pivotally connected relative to the cantilever arm about a vertical pivot axis, and
    a conveyor belt connected to the pivot arm,
    at least one hydraulic cylinder, having a first end affixed to the frame and a second end affixed to the cantilever arm, the cantilever arm being vertically adjustable with respect to the frame by the hydraulic cylinder and movably mounted about a horizontal pivot axis which extends within the frame of the charger.

15. Slewing belt mounting attached to a frame of a charger, comprising:
    a cantilever arm movably mounted at the frame of the charger,
    a pivot arm pivotally connected relative to the cantilever arm about a vertical pivot axis, and
    a conveyor belt connected to the pivot arm,
    at least one hydraulic cylinder, having a first end affixed to the frame and a second end affixed to the cantilever arm, the cantilever arm being vertically adjustable with respect to the frame by the hydraulic cylinder and wherein the conveyor belt comprises a receiving portion which projects under the cantilever arm.

\* \* \* \* \*